US006597744B1

(12) United States Patent
Bettine et al.

(10) Patent No.: US 6,597,744 B1
(45) Date of Patent: Jul. 22, 2003

(54) TRANSMITTER FOR ELECTRONIC ARTICLE SURVEILLANCE SYSTEM

(75) Inventors: Dale Bettine, Coral Springs, FL (US); Stanley Strzelec, Boca Raton, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 0 days.

(21) Appl. No.: 09/378,814

(22) Filed: Aug. 23, 1999

(51) Int. Cl.$^{7}$ .......................... H04L 27/04; G08B 13/14
(52) U.S. Cl. ..................................... 375/295; 340/572.1
(58) Field of Search .......................... 375/295; 340/571, 340/572.1, 568

(56) References Cited

U.S. PATENT DOCUMENTS 5,276,430 A 1/1994 Granovsky .................. 340/572
5,495,229 A * 2/1996 Balch et al. ................ 340/551
5,793,289 A 8/1998 Strzelec ...................... 340/572
6,014,407 A * 1/2000 Hunsinger et al. .......... 194/202

* cited by examiner

*Primary Examiner*—Khai Tran

(57) ABSTRACT

An EAS transmitter for generating an EAS transmission with a preselected guardband, comprises an oscillator for generating a fundamental frequency pulsed waveform and circuitry for effecting spectral window shaping of the fundamental frequency waveform on a time basis corresponding with the guardband for reducing sidelobe energy in the guardband. The transmitter may further include circuitry operative on the spectral window-shaped fundamental frequency waveform for further reducing sidelobe energy of the spectral window-shaped fundamental frequency waveform in frequency correspondence with the guardband. Another EAS transmitter comprises a storage unit having stored therein the sidelobe energy-reduced spectral window-shaped fundamental frequency waveform and obtaining EAS transmissions by use of the stored contents of the storage unit.

22 Claims, 4 Drawing Sheets

TRANSMITTER FOR ELECTRONIC ARTICLE SURVEILLANCE SYSTEM

FIELD OF THE INVENTION

This invention relates generally to electronic article surveillance (EAS) systems and pertains more particularly to improved transmitters for generating magnetic fields for use in EAS systems.

BACKGROUND OF THE INVENTION

Referring to FIG. 1, an EAS transmitter 10 placed in present commercial use by the assignee of the subject application comprises an oscillator 12 which generates a continuous output at 58 KHz, a rectangular pulse generator 14 which generates a rectangular pulse with a 1.6 millisecond ON time, a multiplier 16 receiving inputs from oscillator 12 and pulse generator 14, a linear amplifier 18 which amplifies the output of multiplier 16 and furnishes the amplified output to antenna 20 which radiates energy into a so-called surveillance zone (not shown) to establish a magnetic field in the surveillance zone. EAS tags (markers) entering the surveillance zone and not previously deactivated are activated by the magnetic field and are sensed by an EAS receiver which provides output alarm indication of the presence of the tags in the surveillance zone.

FIG. 2 is a frequency domain plot of the transmitted waveform of the FIG. 1 transmitter. As is seen, the magnetic field is at its highest strength at the carrier frequency of 58 KHz and has sidelobes at 2K aside the carrier frequency which are down only by approximately 20 dB from the 58 KHz fundamental level.

A prospective specification for EAS systems in Europe looks to a "wide exit" with a 60 KHz guardband. The 2K sidelobe strengths of transmitter 10, as illustrated in FIG. 2, only marginally meet the prospective specification.

SUMMARY OF THE INVENTION

The present invention has as its particular and immediate object the provision of an EAS transmitter meeting the guardband requirements of the prospective European EAS specification.

A more general objective of the invention is to provide method and system for conforming EAS transmitter waveforms to any desired fundamental and sidelobe magnitude relationship as may be required by EAS specifications.

A further object of the invention is to reduce energy in selected "keepout" bands of an EAS transmission waveform without loss of strength of the fundamental and without increasing the length of the transmit burst.

In attaining the foregoing and other objects, the invention provides an EAS transmitter for generating an EAS transmission with a preselected guardband, comprising: means for generating a fundamental frequency pulsed waveform; and means for effecting spectral window shaping of the fundamental frequency waveform on a time basis corresponding with the guardband for reducing sidelobe energy in the guardband.

The transmitter may further include means operative on the spectral window-shaped fundamental frequency waveform for further reducing sidelobe energy of the spectral window-shaped fundamental frequency waveform in frequency correspondence with the guardband.

The means for effecting spectral window shaping of the fundamental frequency waveform preferably includes means for generating a pulsed cosine waveform and means for multiplying the fundamental frequency waveform by the pulsed cosine waveform.

A method for effecting EAS transmission in accordance with the invention comprising the steps of: selecting a fundamental frequency pulsed waveform; identifying a guardband for the fundamental frequency pulsed waveform; and effecting spectral window shaping of the fundamental frequency waveform on a time basis corresponding with the identified guardband for reducing sidelobe energy in the identified guardband.

The method may include the further step of reducing sidelobe energy of the spectral window-shaped fundamental frequency waveform in frequency correspondence with the identified guardband.

The step of effecting spectral window shaping of the fundamental frequency waveform is performed in part through the use of a pulsed cosine waveform.

In a still further aspect, the invention contemplates an EAS transmitter in which a storage device stores a digitized transmission waveform derived from a device separable from the transmitter which inputs the digitized transmission waveform to the storage device. The digitized transmission waveform has a fundamental with a suppressed sidelobe.

These and other objects and features of the invention will be further understood from the following detailed description of preferred embodiments and practices thereof and from the drawings.

DETAILED DESCRIPTION OF PREFERRED EMBODIMENTS AND PRACTICES

Figure 1:
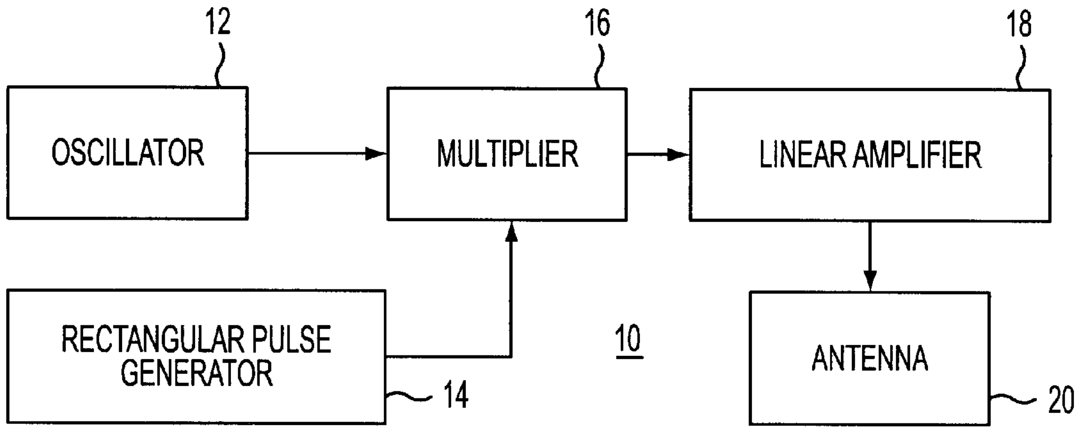
FIG. 1 (PRIOR ART)
FIG. 1 is a functional block diagram of an EAS transmitter in present commercial use.
Figure 2:
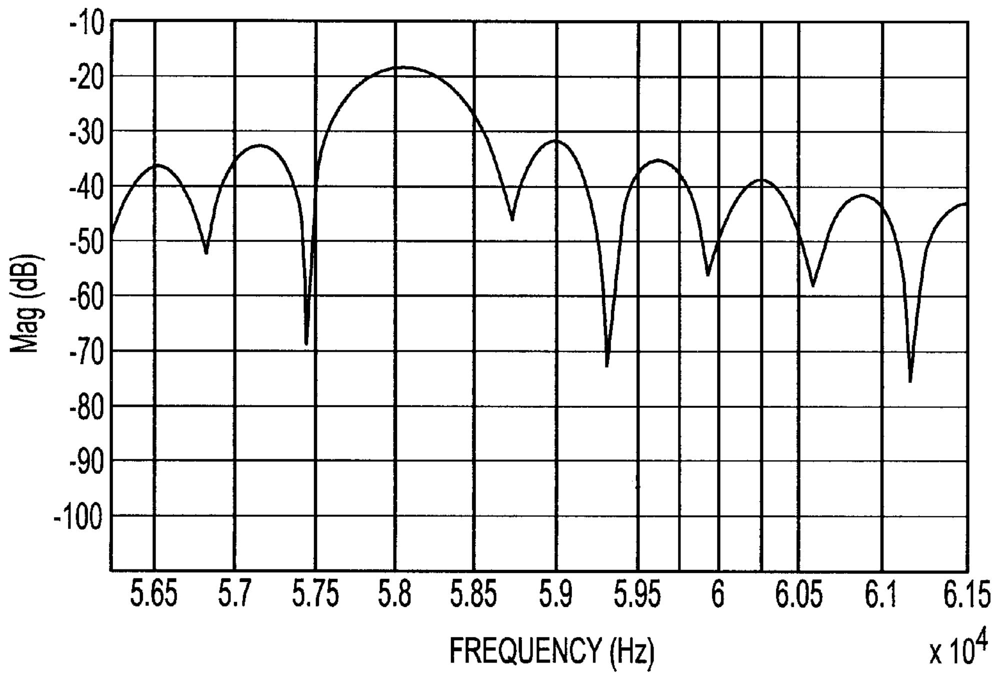
FIG. 2 (PRIOR ART)
FIG. 2 is a frequency domain plot of the transmitted waveform of the FIG. 1 transmitter.
Figure 3:
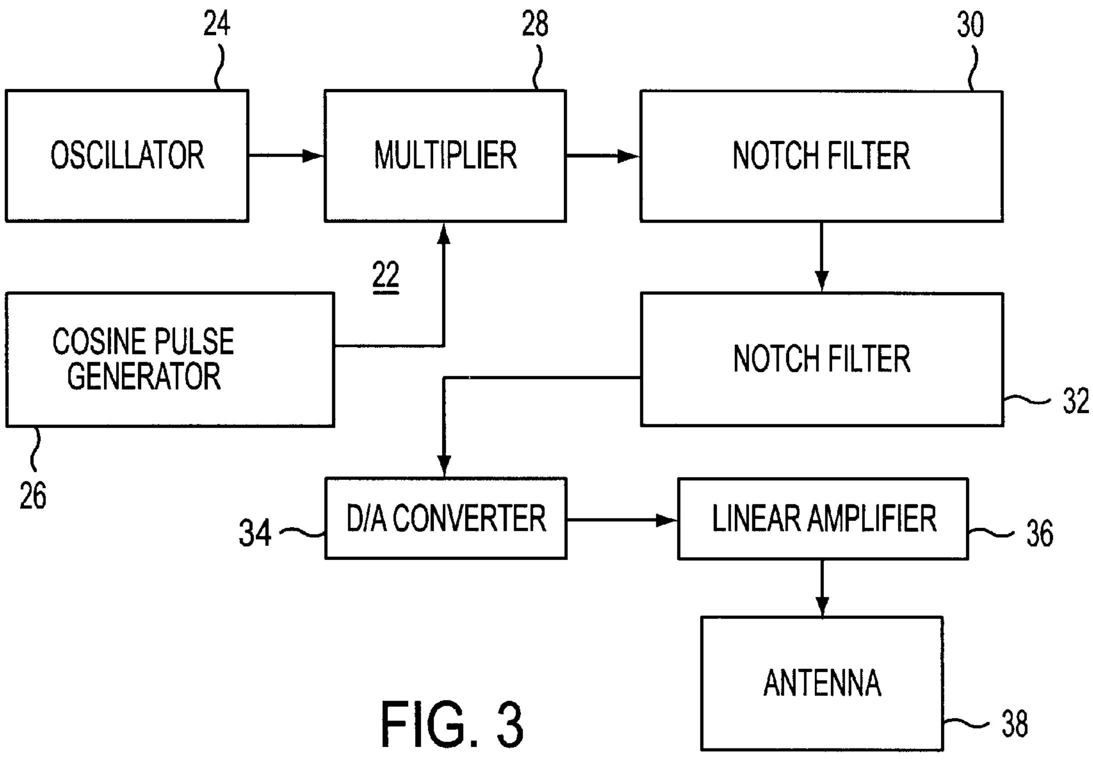
FIG. 3 is a functional block diagram of an EAS transmitter in accordance with the subject invention.

Referring to FIG. 3, EAS transmitter 22 of the invention comprises oscillator 24, cosine pulse generator 26, multiplier 28, notch filters 30 and 32, D/A (digital to analog) converter 34, linear amplifier 36 and antenna 38.

Figure 4:
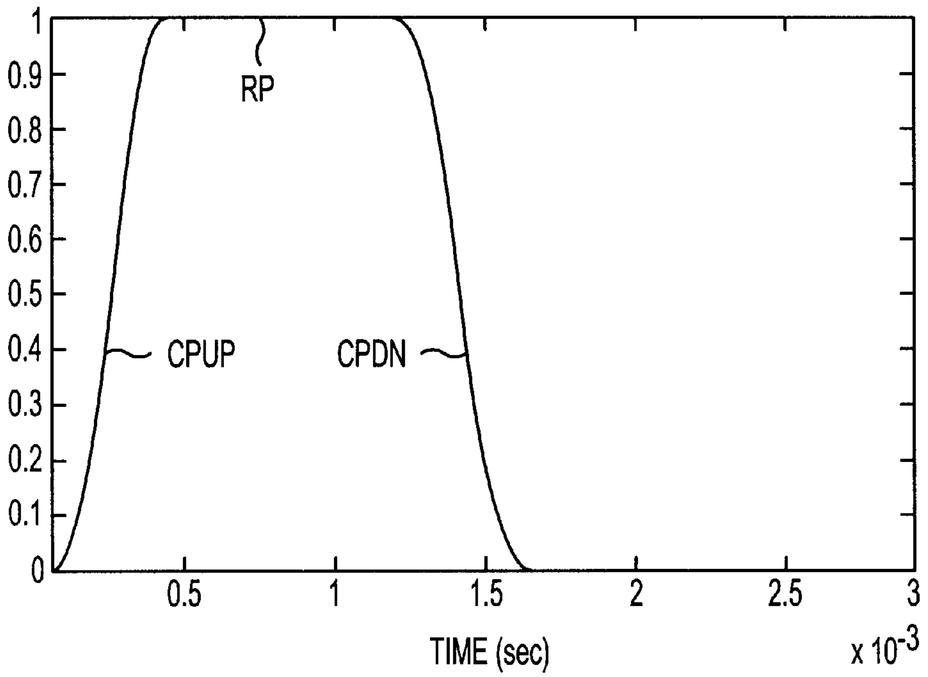
FIG. 4 depicts a cosine (windowed) pulse generator waveform for use in practicing the invention.

Components 24 through 32 are preferably implemented in digital circuitry, particularly to easily implement the notch filters 30 and 32 as high-Q filters and to readily implement the cosine (windowed) pulse generator waveform, which is defined by the following equation:

$$\text{cos\_window}(n)=\sin(\pi n/N)^2 \quad (1)$$

and is shown in FIG. 4.

Referring to FIG. 4, this waveform includes a 400 μsec. cosine pulse (CPUP) to ramp the pulse up, followed by an 800 μsec. rectangular pulse (RP) and then finished with a 450 μsec. cosine pulse (CPDN) to ramp the pulse down. This waveform allows the pulse to ramp up and down gradually, which effects spectral window shaping, reducing the sidelobes and helping to keep the notch filters from ringing excessively. The waveform also allows best tradeoff of ramping the signal up to reduce sidelobe energy while charging EAS tags up quickly for system response.

Notch filters 30 and 32 have H(z) per the following formulation:

$$\frac{1-2\cos(\theta)z^{-1}+z^{-2}}{1-2r\cos(\theta)z^{-1}+r^2z^{-2}} \quad (2)$$

where $$(\theta)=2\pi f_{notch}/f_{sample} \quad (3)$$

and r is the distance of the complex poles to the unit circle (Q) and (θ) sets the frequency of the notch.

Figure 5:
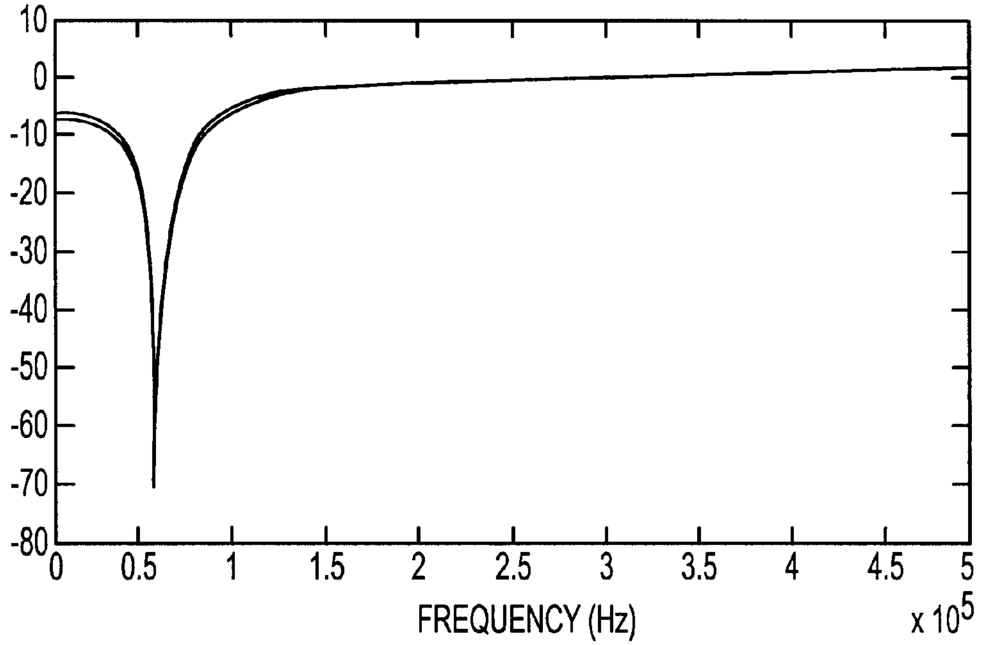
FIG. 5 is a graph showing the frequency response of notch filters for use in practicing the invention.

In the particular example under discussion, for notch filter 30, r is 0.80 and f is 59.650 KHz and, for notch filter 32, r is filters is shown in FIG. 5.

Figure 6:
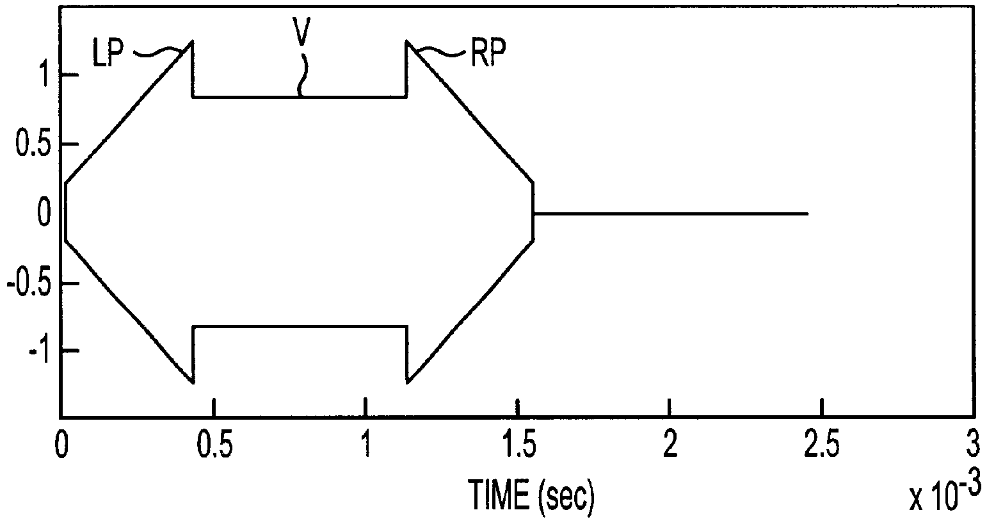
FIG. 6 is a plot of the waveform resulting from the action of notch filtering in accordance with the invention.

FIG. 6 is a plot of the waveform resulting from the action of notch filters 30 and 32 on the output of multiplier 28, which is the product of the fundamental waveform and the spectral window shaping waveform. As is shown, the FIG. 6 waveform has left (LP) and right (RP) peaked portions, one extending from zero time to about 0.4 msec. and one extending from about 1.2 msec. to 1.6 msec. Valley (V) extends from about 0.4 msec. to about 1.2 msec. The PVR (peak to valley ratio) of the waveform is defined by LP/V or RP/V.

While excessive ringing in the notch filters is to be avoided, as above discussed, overshoot (ringing) in the notch filters is desired to achieve the necessary high Q for the filters and is present to the extent needed to further reduce the sidelobe energy 2 KHz away from the carrier, providing the desired guardband.

As an alternative to the notch filters, the required filtering may be achieved by sharp (high Q) low pass filtering.

Figure 7:
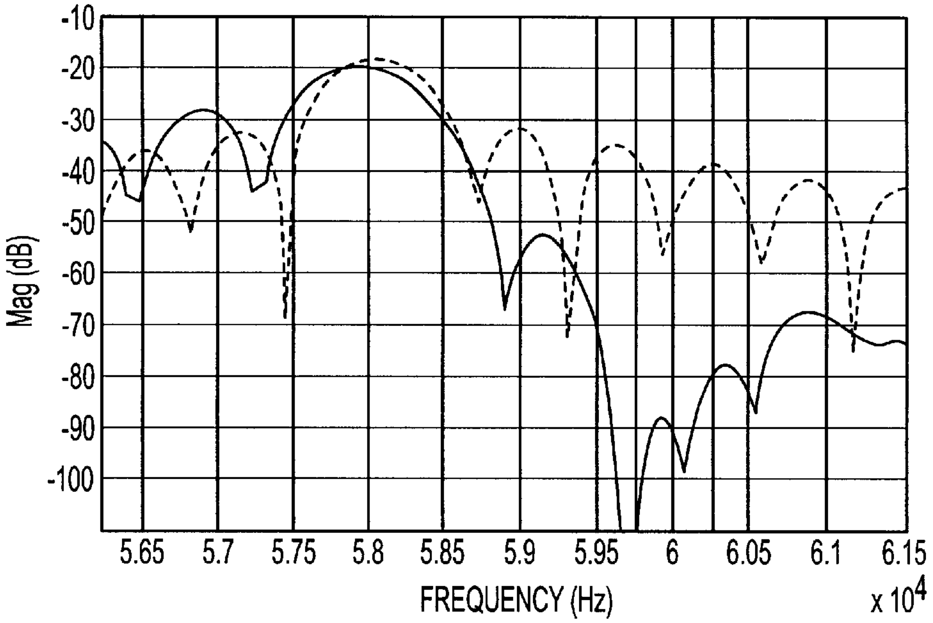
FIG. 7 shows a comparison of the frequency response of the transmitted waveform provided by the subject invention to that of the referenced commercial system.

FIG. 7 compares the frequency response of the transmitted waveform provided by the subject invention (after conversion to analog in D/A converter 34 and amplification by linear amplifier 36) to that of the referenced commercial system. The former is shown in solid lines and the latter in broken lines. As is seen, the invention achieves over 40 dB of rejection in the 60 KHz guardband.

By way of summary of the foregoing, a method in accordance with the invention involves the steps of selecting a fundamental frequency pulsed waveform, identifying a guardband for the fundamental frequency pulsed waveform, effecting spectral window shaping of the fundamental frequency waveform on a time basis corresponding with the identified guardband for reducing sidelobe energy in the identified guardband and further reducing sidelobe energy of the spectral window-shaped fundamental frequency waveform in frequency correspondence with the identified guardband.

The spectral window shaping of the fundamental frequency waveform is preferably performed by the multiplication of the fundamental frequency waveform with a pulsed cosine waveform having up and down ramps time spaced in the pulsed cosine waveform and a central flat portion between the ramps.

The sidelobe energy reduction is preferably practiced through the use of high Q notch filters in which ringing is effected in frequency correspondence with the identified guardband to the extent required for desired sidelobe energy reduction.

In the particular example above discussed, the transmission pulse duration may be from 1.6 msec. to 2.4 msec. in duration. The up ramp window may be 400 μsec (+/−300 μsec.). The down ramp window may be 450 μsec (+/−300 μsec). The PVR (above-described) at the top of the waveform should follow the relation 2.0>PVR>1.0.

Figure 8:
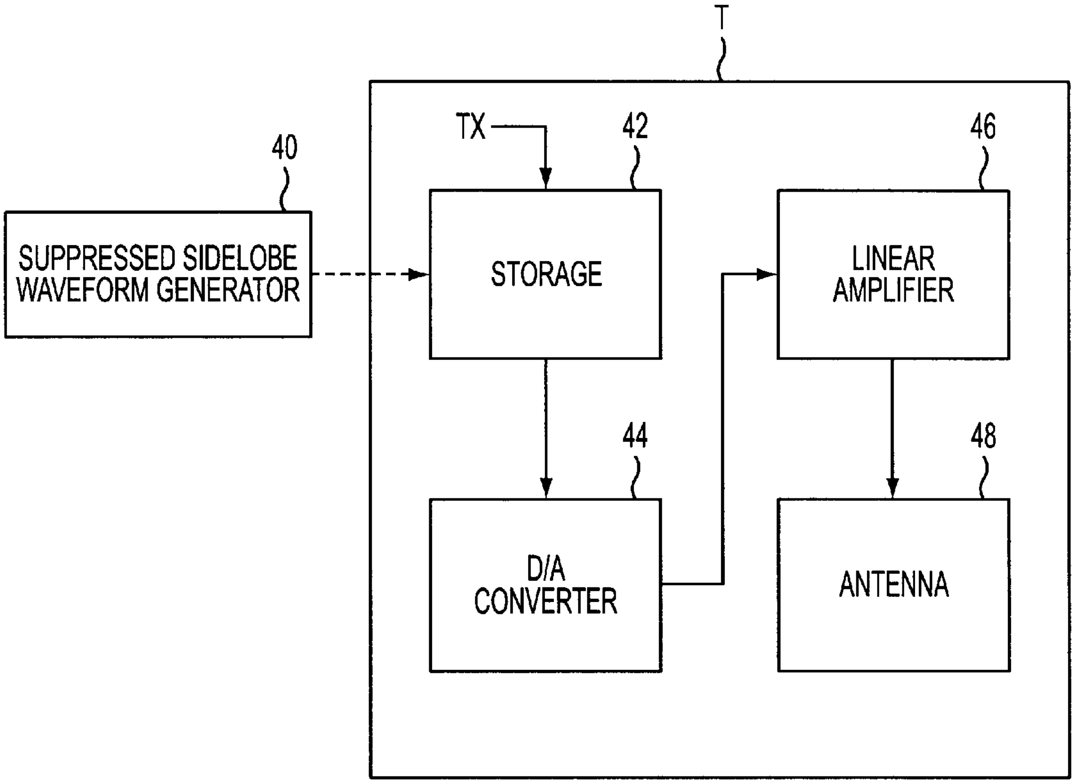
FIG. 8 is 0.78 and f is 59.980 KHz. The frequency response of the notch a functional block diagram of, preferred system arrangement in accordance with the invention.

Turning to FIG. 8, suppressed sidelobe waveform generator 40 may comprise components 24, 26, 28, 30, 32 and 34 of FIG. 3 and generates the analog waveform shown in solid line in FIG. 7.

Transmitter T includes storage 42, which is responsive to input TX (a transmission request signal) to furnish its stored contents to D/A (digital to analog) converter 44. The analog output signal of converter 44 is amplified in linear amplifier 46 and furnished to antenna 48.

The connection between storage 42 and suppressed sidelobe waveform generator 40 is shown as a broken line with the intent to indicate that the connection is a one-time connection, i.e., solely to provide for storage of the suppressed sidelobe waveform in its digitized format. Thereafter, transmitter T operates without connection to generator 40.

The arrangement of FIG. 8 provides a high time-efficient transmission of EAS radiation. Thus, the length of time required for generation of the suppressed sidelobe waveform occurs but once, at loading thereof. Thereafter, for each transmission, the only time involved is that required for readout of the waveform from storage 42.

Various changes may be introduced in the disclosed preferred embodiments and practices without departing from the invention and the disclosure is thus intended in an illustrative and not in a limiting sense. For example, while the preferred form for the up and down ramps of the spectral window shaping waveform is a cosine function, other spectral shaping may be employed for sidelobe reduction. Accordingly, it is to be appreciated that the true spirit and scope of the invention is set forth in the following claims.

What is claimed is:

1. An EAS transmitter for generating an EAS transmission with a preselected guardband, comprising:

means for generating a fundamental frequency pulsed waveform; and means for effecting spectral window shaping of the fundamental frequency waveform on a time basis corresponding with the guardband for reducing sidelobe energy in the guardband wherein said means for effecting spectral window shaping of the fundamental frequency waveform includes means for generating a pulsed cosine waveform.

2. The transmitter claimed in claim 1, further including means operative on the spectral window-shaped fundamental frequency waveform for further reducing sidelobe energy of the spectral window-shaped fundamental frequency waveform in frequency correspondence with the guardband.

3. The transmitter claimed in claim 1, wherein said means for effecting spectral window shaping of the fundamental frequency waveform further includes means for multiplying the fundamental frequency waveform by said pulsed cosine waveform.

4. The transmitter claimed in claim 1 wherein said pulsed cosine waveform is generated to have up and down ramps time spaced in the pulsed cosine waveform and a central flat portion between the ramps.

5. The transmitter claimed in claim 3 wherein said pulsed cosine waveform is generated to have up and down ramps time spaced in the pulsed cosine waveform and a central flat portion between the ramps.

6. The transmitter claimed in claim 2, wherein said means operative on the spectral window-shaped fundamental frequency waveform comprises a first notch filter receiving the spectral window-shaped fundamental frequency waveform and a second notch filter receiving the output of the first notch filter.

7. The transmitter claimed in claim 6, wherein said first and second notch filters are configured to effect ringing for said further reducing sidelobe energy of the spectral window-shaped fundamental frequency waveform in frequency correspondence with the guardband.

8. The transmitter claimed in claim 1, wherein said EAS transmission comprises a waveform having a peak to valley ratio following the relation 2.0>PVR>1.0.

9. A method for effecting EAS transmission, comprising the steps of:

selecting a fundamental frequency pulsed waveform;

identifying a guardband for the fundamental frequency pulsed waveform; and effecting spectral window shaping of the fundamental frequency waveform on a time basis corresponding with the identified guardband for reducing sidelobe energy in the identified guardband wherein said step of effecting spectral window shaping of the fundamental frequency waveform is performed in part through the use of a pulsed cosine waveform.

10. The method claimed in claim 9, including the further step of reducing sidelobe energy of the spectral window-shaped fundamental frequency waveform in frequency correspondence with the identified guardband.

11. The method claimed in claim 9, wherein said step of effecting spectral window shaping of the fundamental frequency waveform is performed in further part by multiplying the fundamental frequency waveform by said pulsed cosine waveform.

12. The method claimed in claim 9 wherein said pulsed cosine waveform is selected to have up and down ramps time spaced in the pulsed cosine waveform and a central flat portion between the ramps.

13. The method claimed in claim 11 wherein said pulsed cosine waveform is selected to have up and down ramps time spaced in the pulsed cosine waveform and a central flat portion between the ramps.

14. The method claimed in claim 10, wherein the further step of reducing sidelobe energy of the spectral window-shaped fundamental frequency waveform in frequency correspondence with the identified guardband is effected by an outset step of notch-filtering the spectral window-shaped fundamental frequency waveform and a subsequent step of notch-filtering the result of the outset step.

15. The method claimed in claim 14, wherein each of the notch-filtering steps is practiced by effecting ringing for said further reducing sidelobe energy of the spectral window-shaped fundamental frequency waveform in frequency correspondence with the guardband.

16. The method claimed in claim 9, wherein said fundamental frequency is selected to be about 60 KHz and wherein said guardband is selected to be about 2 KHz.

17. The method claimed in claim 9, wherein said EAS transmission comprises a waveform having a peak to valley ratio following the relation 2.0>PVR>1.0.

18. An EAS transmitter for generating an EAS transmission with a preselected guardband, comprising:

means for generating a fundamental frequency pulsed waveform;

means for effecting spectral window shaping of the fundamental frequency waveform on a time basis corresponding with the guardband for reducing sidelobe energy in the guardband; and a plurality of notch filters configured to effect ringing for further reducing sidelobe energy of the spectral window-shaped fundamental frequency waveform in frequency correspondence with the guardband.

19. The transmitter claimed in claim 18 wherein said means for effecting spectral window shaping of the fundamental frequency waveform includes means generating a pulsed cosine waveform.

20. The transmitter claimed in claim 19, wherein said means for effecting spectral window shaping of the fundamental frequency waveform further includes means for multiplying the fundamental frequency waveform by said pulsed cosine waveform.

21. The transmitter claimed in claim 18, wherein said plurality of notch filters comprises a first notch filter and a second notch filter connected in series with said first notch filter.

22. The transmitter claimed in claim 18, wherein said EAS transmission comprises a waveform having a peak to valley ratio following the relation 2.0>PVR>1.0.

* * * * *